(No Model.)
H. OGBORN.
CULINARY VESSEL.
No. 306,637. Patented Oct. 14, 1884.
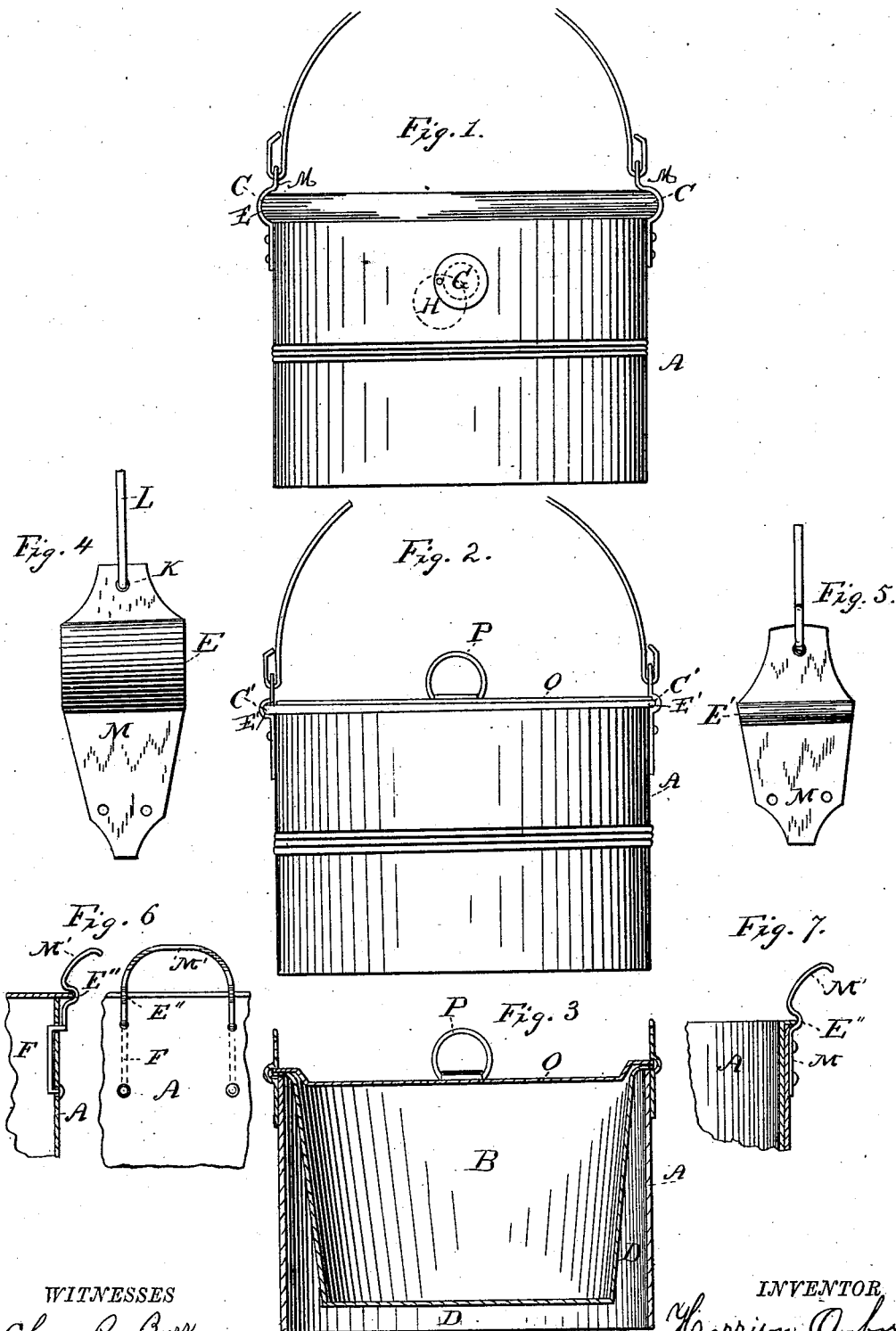

UNITED STATES PATENT OFFICE.

HARRISON OGBORN, OF RICHMOND, INDIANA, ASSIGNOR, BY DIRECT AND MESNE ASSIGNMENTS, TO RHODA C. OGBORN AND RALPH W. NYE, BOTH OF SAME PLACE.

CULINARY VESSEL.

SPECIFICATION forming part of Letters Patent No. 306,637, dated October 14, 1884.

Application filed July 7, 1883. (No model.)

*To all whom it may concern:*

Be it known that I, HARRISON OGBORN, a citizen of the United States, residing at Richmond, in the county of Wayne and State of Indiana, have invented new and useful Improvements in Culinary Vessels; and I do hereby declare the following to be a full, clear, and exact description of my invention, such as will enable others skilled in the art to which it appertains to make and use the same, reference being had to the accompanying drawings, and to figures and letters of reference marked thereon, which form part of this specification.

My invention relates to that class of culinary vessels in which an inner vessel, of metal, glass, stone, china, granite, earthenware, crockery-ware, or other suitable material, is inclosed in an outer rim, case, or shield composed of tin, sheet-iron, or preferably of Russia iron, so as to form an air-chamber between the case and vessel, and between the stove or heated surface and the bottom of the vessel, for catching and retaining the rising heat around and in contact with the entire sides and bottom of said inner vessel.

The invention therefore consists in novel features of construction of a cooking utensil, composed of a vessel and case interchangeable, and permanently or detachably attached by means of lugs and grooves, all as will be hereinafter fully described, and set forth in the claims hereto annexed.

In the accompanying drawings, Figure 1 is an exterior view of my invention when the inner vessel is a crock of earthenware, the ears and grooves being larger than in Fig. 2, where a metal vessel is used. Fig. 3 is a vertical sectional view of the utensil. Fig. 4 is a detached view of an ear containing the clasping-grooves. Fig. 5 is the same view of a smaller ear and groove for use where metal vessels are used.

Like letters of reference indicate corresponding parts in the different figures.

The inner vessel, B, is made of tin, iron, stone, granite-ware, or other metal, stone, china, Rockingham earthenware, crockery, or other suitable material, and in any desired form, but preferably as shown in Fig. 3. This vessel is surrounded with a cylindrical case, A, made of Russia iron or other suitable material. The vessel B is made with an outward-projecting edge, as shown at C C'. (See Figs. 1 and 2.) Attached to the case A are two ears, M, having grooves E E', by which the vessel is held in place within the case A. The case A is usually cylindrical, but may be made wider at the bottom, to inclose more space on the stove and to permit of being more closely packed for storage and shipment. This case should fit the vessel at its top, as shown in Fig. 3, and extend downward, as shown in Fig. 3, to a greater depth than the bottom of the vessel B, to raise the bottom of the vessel above the stove, preferably about one-third of an inch, to prevent scorching the food being cooked. The case also forms the outside wall of the air or steam chamber surrounding the vessel B on sides and bottom, for retaining and utilizing the heat arising from the stove or other hot surface when placed thereon, and thus prevent the escape and loss of heat that would otherwise occur without the hot-air chamber.

The case A may be provided with one or more ventilating-holes, G, near the top, near which is pivoted a suitable cover, H, for opening and closing the same, so that a portion of the heat may be allowed to escape when desirable. I attach to the case A a pair of ears, Figs. 4 and 5. These ears have holes near their top, to which the bail is attached, and have grooves E E', into which the outer edge of the vessel or annular rim thereon is pressed for permanently or detachably attaching the vessel and rim together, as may be desired. In lieu of a bail the utensil may be supplied with handles, (see Figs. 6 and 7,) wherein the grooves are used as in Fig. 5.

In Fig. 6 the handles are shown made of wire, and in Fig. 7 they are metal struck up or cast. In either case no bail is used.

In making my apparatus I use the vessels usually sold by the trade, thus obviating the expense of manufacturing special goods for the purpose. I form the outer case of one piece of metal, as shown, and preferably attach ears M M thereto for permanently or detachably attaching the vessel A and case B, if it is desired. To permanently attach together the vessel B and case A, the case is cut the proper width and length and brought up around the vessel tightly, and the ends securely fastened together. This brings the ears tightly over the flange C or C', and firmly unites the parts. If it is desired to detachably attach together the vessel B and case A, the case is made to fit the vessel B loosely at its upper edge, the case ends being united and the ears rigidly attached. The vessel B is placed in the case and the flange or edge C on one side placed in the groove E in ear M, and the other side of the vessel pushed gently and firmly downward. The rim will then spring outward and the vessel inward, when the free edge of the vessel will slip into the groove in the other on the opposite side, and the vessel will thus be securely but detachably attached to the outer case, A. The reverse of this operation will detach the vessel. I prefer to make the apparatus in the last-described form, for the reasons, among many others, that should a vessel become useless from any cause another may be readily substituted. The vessel should be supplied with a suitable cover, which is held in place by the slot E in the ears M.

The operation of my invention is as follows: The vessel containing the food to be cooked is placed on a hot surface or in an oven, with cover in place, when the hot air immediately fills the hot-air chamber D and freely distributes itself through the contents of the vessel B, as it has direct access to the sides and bottom of the vessel. The hot air also fills the space above the food, and it is cooked quickly and uniformly without danger of burning or without the necessity of having to stir the food constantly to keep it from burning, as is the case with vessels that come in direct contact with hot surfaces. The stirring of food while cooking takes much valuable time and greatly damages it, as it separates and breaks the particles, expels the air, and makes it pasty, and therefore heavy, unpalatable, and indigestible.

The advantages of my invention are obvious to those skilled in the art of cooking. The apparatus is especially adapted to be used for cooking rice, grits, puddings, pies, sauces, sweetmeats, and cakes, preserving and canning fruits and vegetables, boiling and evaporating juices, &c.

I construct my invention both with and without the ventilating-perforations, as may be desired, as respectively shown in Figs. 1 and 2.

Having thus described the nature, construction, and operation of my invention, what I claim therein as new and useful, and desire to secure by Letters Patent, is—

1. The combination, with the vessel B, having outwardly-projecting edge or annular projecting bead or rim, of a case, A, and ears having the grooves E, for the purpose of permanently or detachably connecting the vessel B and case A together, substantially as herein set forth and described.

2. The combination, with a vessel, B, having an outwardly-projecting edge or rim at or near its top, and an inclosing-band, A, as described, of ears each having a groove for the reception of the edge of the vessel, and a hole, K, for the reception of a bail, L, for the purposes and uses and in the manner substantially as herein set forth and described.

In testimony whereof I affix my signature in presence of two witnesses.

HARRISON OGBORN.

Witnesses:
W. E. BOWEN,
CHAS. R. BURR.